(12) United States Patent
Heo

(10) Patent No.: US 11,579,664 B2
(45) Date of Patent: Feb. 14, 2023

(54) ELECTRONIC APPARATUS

(71) Applicant: Samsung Display Co., Ltd., Yongin-si (KR)

(72) Inventor: Sejun Heo, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/697,042

(22) Filed: Nov. 26, 2019

(65) Prior Publication Data
US 2020/0301482 A1    Sep. 24, 2020

(30) Foreign Application Priority Data

Mar. 19, 2019    (KR) .................. 10-2019-0031271

(51) Int. Cl.
*G06F 1/16*      (2006.01)
*G06V 40/13*     (2022.01)

(52) U.S. Cl.
CPC .......... *G06F 1/1684* (2013.01); *G06F 1/1601* (2013.01); *G06V 40/1306* (2022.01); *G06V 40/1318* (2022.01)

(58) Field of Classification Search
CPC ........................................................ H05K 1/00
See application file for complete search history.

(56) References Cited

U.S. PATENT DOCUMENTS

| | | | |
|---|---|---|---|
| 9,063,699 B1 * | 6/2015 | Huang | G06F 1/1643 |
| 10,318,789 B2 | 6/2019 | Park et al. | |
| 2017/0300736 A1 | 10/2017 | Song et al. | |
| 2017/0371461 A1 | 12/2017 | Lee et al. | |
| 2018/0151641 A1 * | 5/2018 | Choo | G06F 1/1643 |
| 2018/0225499 A1 | 8/2018 | Han et al. | |
| 2018/0225501 A1 | 8/2018 | Mienko et al. | |
| 2018/0239941 A1 | 8/2018 | Mackey et al. | |
| 2018/0373913 A1 * | 12/2018 | Panchawagh | G01S 7/52079 |

FOREIGN PATENT DOCUMENTS

| | | |
|---|---|---|
| KR | 10-2017-0087010 A | 7/2017 |
| KR | 10-2017-0097318 A | 8/2017 |
| KR | 10-2017-0125778 A | 11/2017 |
| KR | 10-2017-0140454 A | 12/2017 |

* cited by examiner

*Primary Examiner* — Jerry Wu
(74) *Attorney, Agent, or Firm* — Lewis Roca Rothgerber Christie LLP

(57) ABSTRACT

An electronic apparatus includes a display panel including a front surface and a rear surface opposite to the front surface, a lower panel having an opening portion defined therein, a fingerprint sensor including an upper portion, a lower portion, and a lateral portion, the sensor being in the opening portion with a space from a side wall of the opening portion, and an adhesive portion to bond the fingerprint sensor to the display panel. The adhesive portion includes a first adhesive portion between the rear surface of the display panel and the upper portion of the fingerprint sensor and a second adhesive portion around at least a portion of the lateral portion of the fingerprint sensor, and a minimum width and a minimum thickness of the second adhesive portion are each at least ½ of a thickness of the fingerprint sensor.

10 Claims, 15 Drawing Sheets

ELECTRONIC APPARATUS

CROSS-REFERENCE TO RELATED APPLICATIONS

This patent application claims priority to and the benefit of Korean Patent Application No. 10-2019-0031271, filed on Mar. 19, 2019, the entire content of which is hereby incorporated by reference.

BACKGROUND

1. Field

The present disclosure herein relates to an electronic apparatus, and more particularly, to an electronic apparatus including a fingerprint sensing unit.

2. Description of the Related Art

Electronic devices provide various suitable functions capable of communicating with the user, such as providing information to the user by displaying images or sensing the user's input.

Recent electronic devices include functions for sensing the user's fingerprint. Fingerprint recognition methods are divided into a capacitive method of sensing changes in the capacitance of a capacitor between electrodes, an optical method of sensing incident light by using an optical sensor, or an ultrasonic method of sensing vibrations by using a piezoelectric body and/or the like. State-of-the-art electronic devices have fingerprint sensing units for fingerprint detection that can be disposed on the rear surface of a display panel and assembled thereto.

SUMMARY

An aspect of the present disclosure is directed toward an electronic apparatus including a fingerprint sensing unit.

An embodiment of the inventive concept provides an electronic apparatus including: a display panel including a front surface divided into an active area and a peripheral area adjacent to the active area and a rear surface opposite to the front surface; a lower panel disposed on the rear surface of the display panel and having an opening portion defined therein; a fingerprint sensor including an upper portion divided into a sensing area and a non-sensing area adjacent to the sensing area, a lower portion opposite to the upper portion, and a lateral portion to connect the upper portion to the lower portion, the fingerprint sensor being in the opening portion with a space from a side wall of the opening portion; and an adhesive portion to bond the fingerprint sensor to the display panel. The adhesive portion includes: a first adhesive portion between the rear surface of the display panel and the upper portion of the fingerprint sensor; and a second adhesive portion around (e.g., to surround) at least a portion of the lateral portion of the fingerprint sensor, and a minimum width and a minimum thickness of the second adhesive portion are each at least ½ of a thickness of a fingerprint sensor.

In an embodiment, the first adhesive portion may have a closed line shape surrounding the sensing area when viewed in a plan view, and the second adhesive portion may surround the first adhesive portion.

In an embodiment, the first adhesive portion may cover an entire surface of the upper portion of the fingerprint sensor.

In an embodiment, the second adhesive portion may include: a first surface being in contact with the rear surface of the display panel; a second surface being in contact with the lateral portion of the fingerprint sensor; and a third surface to connect the first surface to the second surface, and the third surface may be inclined from the rear surface of the display panel.

In an embodiment, the third surface may be a curved surface.

In an embodiment, an angle of a tangent line at a point between the first surface and the third surface may be at least 40° and not more than 60°.

In an embodiment, an angle of a tangent line at a point between the first surface and the third surface may be an obtuse angle.

In an embodiment, the first adhesive portion may be a tape.

In an embodiment, the second adhesive portion may be a resin.

In an embodiment, the second adhesive portion may fill the space and may be in contact with the rear surface of the display panel.

In an embodiment, the upper portion of the fingerprint sensor may be exposed from the second adhesive portion.

In an embodiment, a maximum width and a maximum thickness of the second adhesive portion may each be not more than ⅘ of the thickness of the fingerprint sensor.

In an embodiment, the fingerprint sensor may be an optical and/or ultrasonic sensor.

In an embodiment, the electronic apparatus may further include a circuit board connected to the peripheral area of the display panel and a sensing circuit board connected to the fingerprint sensor, and the circuit board and the sensing circuit board may be connected to each other.

In an embodiment, the lower panel may include at least one of a light-shielding sheet, a cushion sheet, or a heat dissipation sheet.

In an embodiment of the inventive concept, an electronic apparatus includes: a display panel including a front surface divided into an active area and a peripheral area adjacent to the active area and a rear surface opposite to the front surface; a fingerprint sensor disposed on the rear surface of the display panel and including an upper portion divided into a sensing area and a non-sensing area adjacent to the sensing area and facing the rear surface of the display panel, a lower portion opposite to the upper portion, and a lateral portion to connect the upper portion to the lower portion; a first adhesive portion being in contact with the rear surface of the display panel and the upper portion of the fingerprint sensor; and a second adhesive portion being in contact with at least a portion of the lateral portion of the fingerprint sensor. The first adhesive portion has a closed line shape when viewed in a plan view, and the second adhesive portion is around (e.g., surrounds) the first adhesive portion.

In an embodiment, a minimum width and a minimum thickness of the second adhesive portion may each be at least ½ of a thickness of the fingerprint sensor.

In an embodiment, a maximum width and a minimum thickness of the second adhesive portion may each be not more than ⅘ of a thickness of the fingerprint sensor.

In an embodiment, the electronic apparatus may further include a lower panel disposed on the rear surface of the display panel and having an opening portion defined therein.

In an embodiment, the fingerprint sensor may be in the opening portion with a space from a side wall of the opening portion.

In an embodiment, the first adhesive portion may be a tape, and the second adhesive portion may be a resin.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1A:
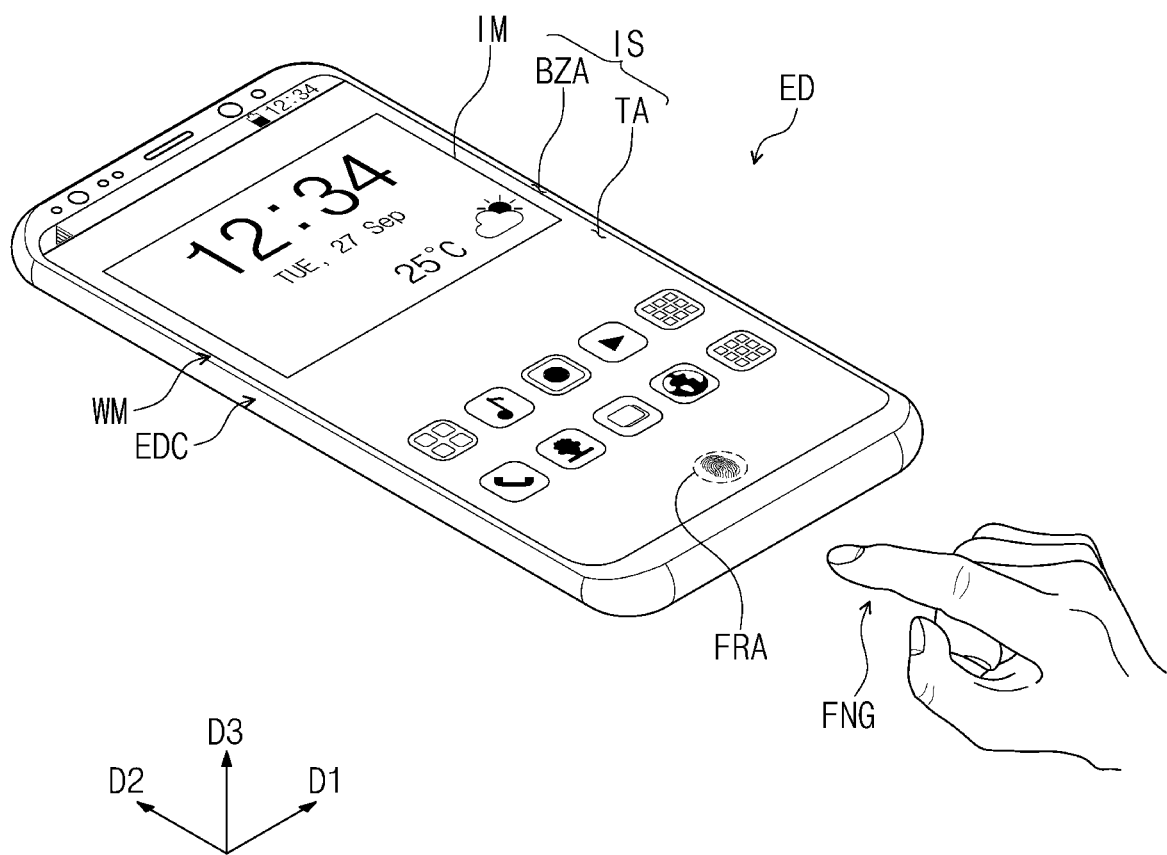
FIG. 1A is a perspective view of an electronic apparatus in accordance with an embodiment of the inventive concept.

It will be understood that when an element or layer is referred to as being "on," "connected to," or "coupled to" another element or layer, it can be directly on, connected to, or coupled to the other element or layer, or intervening elements or layers may be present.

Like numbers refer to like elements throughout. The thickness and the ratio and the dimension of the element are exaggerated for effective description of the technical contents.

As used herein, the term "and/or" includes any and all combinations of one or more of the associated listed items.

It will be understood that, although the terms first, second, etc., may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present invention. As used herein, the singular forms, "a," "an," and "the" are intended to include the plural forms as well, unless the context clearly indicates otherwise.

Also, the terms "under," "below," "above," "upper," and the like are used herein for explaining the relationship between one or more elements illustrated in the drawings. The terms may be relative terms and are described in the orientations illustrated in the drawings.

Unless otherwise defined, all terms (including technical and scientific terms) used herein have the same meaning as commonly understood by those skilled in the art to which the present disclosure belongs. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

It should be understood that the terms "comprises," "comprising," "includes," and/or "including," when used herein, specify the presence of stated features, integers, steps, operations, elements, components, and/or combinations thereof, but do not preclude the presence or addition of one or more other features, integers, steps, operations, elements, components, and/or combinations thereof.

Further, the use of "may" when describing embodiments of the inventive concept refers to "one or more embodiments of the inventive concept."

Also, any numerical range recited herein is intended to include all sub-ranges of the same numerical precision subsumed within the recited range. For example, a range of "¼ to ⅘" or "at least ¼ and not more than ⅘" is intended to include all subranges between (and including) the recited minimum value of ¼ and the recited maximum value of ⅘, that is, having a minimum value equal to or greater than ¼ and a maximum value equal to or less than ⅘, such as, for example, ½ to ¾. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

As used herein, the terms "use," "using," and "used" may be considered synonymous with the terms "utilize," "utilizing," and "utilized," respectively.

Hereinafter, embodiments of the present invention will be explained in detail with reference to the accompanying drawings.

Figure 1B:
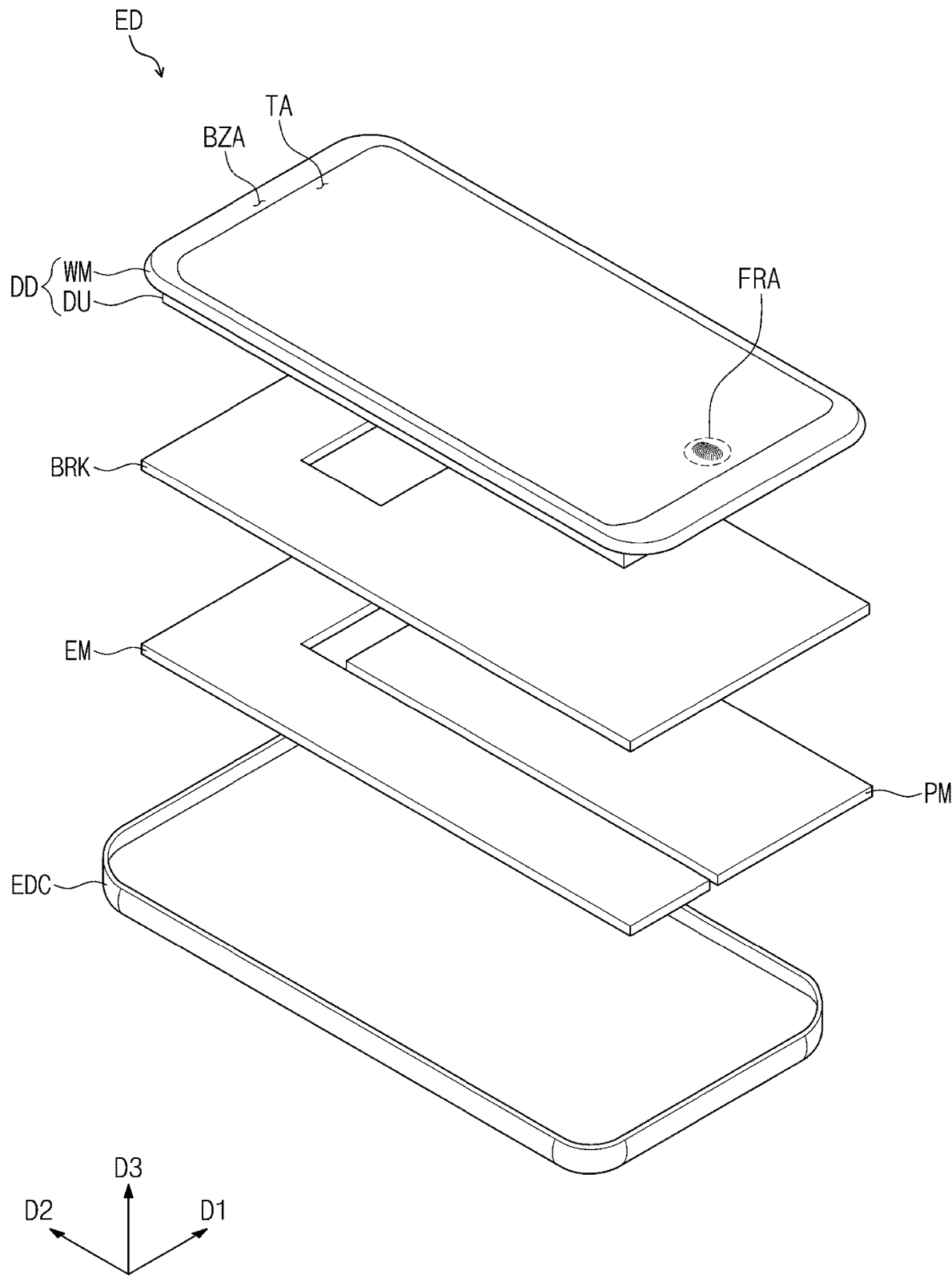
FIG. 1B is an exploded perspective view of the electronic apparatus illustrated in FIG. 1A.
Figure 2:
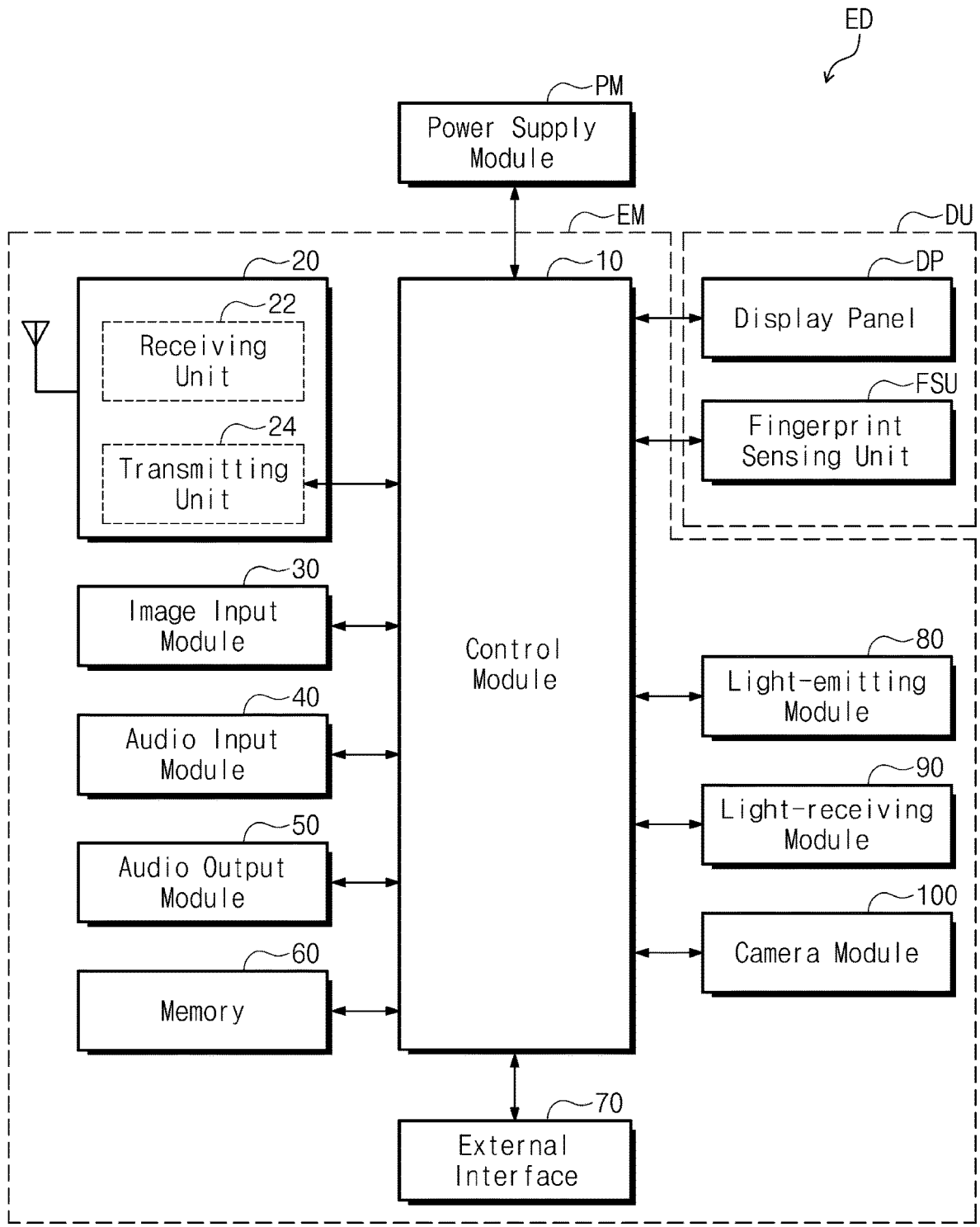
FIG. 2 is a block diagram of the electronic apparatus illustrated in FIG. 1A.

FIG. 1A is a perspective view of an electronic apparatus in accordance with an embodiment of the inventive concept. FIG. 1B is an exploded perspective view of the electronic apparatus illustrated in FIG. 1A. FIG. 2 is a block diagram of the electronic apparatus illustrated in FIG. 1A.

An electronic apparatus ED may be a device activated in response to an electrical signal. The electronic apparatus ED may include various suitable embodiments. For example, the electronic apparatus ED may include a tablet personal computer (PC), a laptop PC, a desktop PC, a smart television, and the like. In the present embodiment, the electronic apparatus ED is illustratively depicted as a smartphone.

The electronic apparatus ED may display an image IM on a display surface IS parallel to each of a first direction D1 and a second direction D2 in a third direction D3. The display surface IS, on which the image IM is displayed, may correspond to a front surface of the electronic apparatus ED. The image IM may include a still image as well as a dynamic image. FIG. 1A illustrates a search window as an example of the image IM.

In the present embodiment, a front surface (or an upper surface) and a rear surface (or a lower surface) of each member are defined with respect to a direction in which the image IM is displayed. The front surface and the rear surface are opposite to each other in the third direction D3, and the normal direction of each of the front surface and the rear surface, may be parallel to the third direction D3.

The distance between the front surface and the rear surface in the third direction D3 may correspond to the thickness or height of a display panel DP in the third direction D3. Directions, indicated by the first to third directions D1, D2, and D3, may be relative concepts and may be changed to other directions. Hereinafter, the first to third directions D1 to D3 indicate the directions, respectively, and are denoted by the same reference signs.

The front surface of the electronic apparatus ED may be divided into a transmitting area TA and a bezel area BZA. The transmitting area TA may be an area in which the image IM is displayed. A user views the image IM through the transmitting area TA. In the present embodiment, the vertexes of the transmitting area TA are illustrated in a rounded quadrangular shape. The transmitting area TA is illustrative only. The transmitting area TA may also have various suitable shapes, but is not limited to any one embodiment.

The bezel area BZA is adjacent to the transmitting area TA. The bezel area BZA may have a set or predetermined color. The bezel area BZA may encompass the transmitting area TA. Thus, the shape of the transmitting area TA may be substantially defined by the bezel area BZA. The bezel area BZA is illustrative only. The bezel area BZA may also be disposed adjacent to only one side of the transmitting area TA or omitted. The electronic apparatus ED, in accordance with an embodiment of the inventive concept, may include various suitable embodiments, but is not limited to any one embodiment.

The electronic apparatus ED may sense the user's fingerprint FNG applied from the outside. Thus, the electronic apparatus ED may provide a fingerprint sensing area FRA on the display surface IS. In the present embodiment, the fingerprint sensing area FRA is illustrated as being provided within the transmitting area TA in which the image IM is displayed. The fingerprint sensing area FRA is illustrative only. The fingerprint sensing area FRA may also be provided in the bezel area BZA, the entirety of the transmitting area TA, or the entirety of the front surface. The electronic apparatus ED may sense the fingerprint FNG provided on the fingerprint sensing area FRA.

The user's fingerprint FNG may include a surface state of the user's hand, for example, surface uniformity or surface or curve shape. The fingerprint FNG is illustrative only. When an intangible object's input is provided to the electronic apparatus ED, the electronic apparatus ED may also sense surface information of the intangible object.

Referring to FIGS. 1B and 2, the electronic apparatus ED may include a display device DD, an electronic module EM, a power supply module PM, a bracket BRK, and an external case EDC. FIG. 1B simply illustrates components of the electronic apparatus ED.

The display device DD includes a window WM and a display panel unit DU. As illustrated in FIG. 1A, the window WM forms the exterior of the electronic apparatus ED in a coupled state. The window WM may be a component configured to protect, from external impacts, the components of the electronic apparatus ED and substantially provide the display surface IS of the electronic apparatus ED.

The display panel unit DU is disposed on a rear surface of the window WM. The display panel unit DU may include the display panel DP and a fingerprint sensing unit FSU (see FIG. 3A). The display panel DP may be a component configured to substantially generate the image IM. The image IM, generated by the display panel DP, is displayed on the display surface IS through the transmitting area TA and viewed externally by the user.

The fingerprint sensing unit FSU senses the user's fingerprint FNG applied from the outside. As described above, the fingerprint sensing unit FSU may sense the user's fingerprint FNG (hereinafter including the surface information of the intangible object) provided on the fingerprint sensing area FRA. The fingerprint sensing unit FSU will be detailed later.

The display panel unit DU may be electrically connected to the electronic module EM through a flexible circuit board (FCB). The display panel unit DU may receive information on the image IM to be displayed through the electronic module EM or may provide information on the sensed fingerprint FNG to the electronic module EM and may provide, to the user, information processed on the basis of the information.

The power supply module PM supplies power necessary for the overall operation of the electronic apparatus ED. The power supply module PM may include a related art battery module.

The bracket BRK is coupled to the display device DD and/or the external case EDC to partition an internal space of the electronic apparatus ED. The bracket BRK provides a space in which other components may be disposed. Further, the bracket BRK may support the display device DD such that the display device DD is fixed without shaking. The bracket BRK may have a coupling groove defined therein and corresponding to the shape of the electronic module EM such that the electronic module EM is fixed thereto. The bracket BRK includes a metallic or plastic member. One bracket BRK is illustrative only, but the electronic apparatus ED may also include a plurality of brackets BRK.

The external case EDC may be coupled to the bracket BRK and/or the display device DD. In the present embodiment, the external case EDC forms the exterior of the electronic apparatus ED together with the window WM. In the present embodiment, the external case EDC formed as one body is illustrative only, but the external case EDC may also include a plurality of bodies assembled to each other. The external case EDC may include a plurality of frames and/or plates made of glass, plastic, or metal.

The electronic module EM includes a motherboard and various suitable functional modules mounted on the motherboard and configured to operate the electronic apparatus ED. The motherboard may be electrically connected to the display device DD through a connector. In this case, the motherboard may include a rigid printed circuit board (PCB).

Referring to FIG. 2, the electronic module EM may include a control module 10, a wireless communication module 20, an image input module 30, an audio input module 40, an audio output module 50, a memory 60, an external interface 70, a light-emitting module 80, and a light-receiving module 90, and a camera module 100. A portion of the modules may be electrically connected to the motherboard through the FCB without being mounted on the motherboard.

The control module 10 controls the overall operation of the electronic apparatus ED. The control module 10 may be a microprocessor. For example, the control module 10 activates or deactivates the display device DD. The control module 10 may control the image input module 30, the audio input module 40, and the audio output module 50 on the basis of a touch signal received from the display device DD.

The wireless communication module 20 may transmit a wireless signal to, or receive a wireless signal from, other terminals by using a Bluetooth or a Wi-Fi circuit. The wireless communication module 20 may transmit or receive an audio signal by using a normal communication line. The wireless communication module 20 includes a transmitting unit 24 configured to modulate and transmit a signal to be transmitted and a receiving unit 22 configured to demodulate a received signal.

The image input module 30 processes an image signal to convert the processed image signal into image data that may be displayed on the display device DD. The audio input module 40 receives an external audio signal by means of a microphone in a recording mode, a voice recognition mode, and/or the like and converts the received external audio signal into electrical audio data. The audio output module 50 converts audio data received from the wireless communication module 20 or that stored in the memory 60 and outputs the converted audio data to the outside.

The external interface 70 serves as an interface connected to an external charger, a wired or wireless data port, a card socket (for example, a memory card, a subscriber identity module (SIM) or user identification module (UIM) card), and/or the like.

The light-emitting module 80 generates and outputs light. The light-emitting module 80 may output infrared light. The light-emitting module 80 may include a light-emitting diode (LED) device. The light-receiving module 90 may sense infrared light. The light-receiving module 90 may be activated when infrared light of a set or predetermined level or higher is sensed. The light-receiving module 90 may include a complementary metal-oxide-semiconductor (CMOS) sensor. After the infrared light generated by the light-emitting module 80 is outputted, the outputted infrared light may be reflected by means of an external object (for example, the user's finger or face), and the reflected infrared light may be incident on the light-receiving module 90. The camera module 100 captures an external image.

Figure 3A:
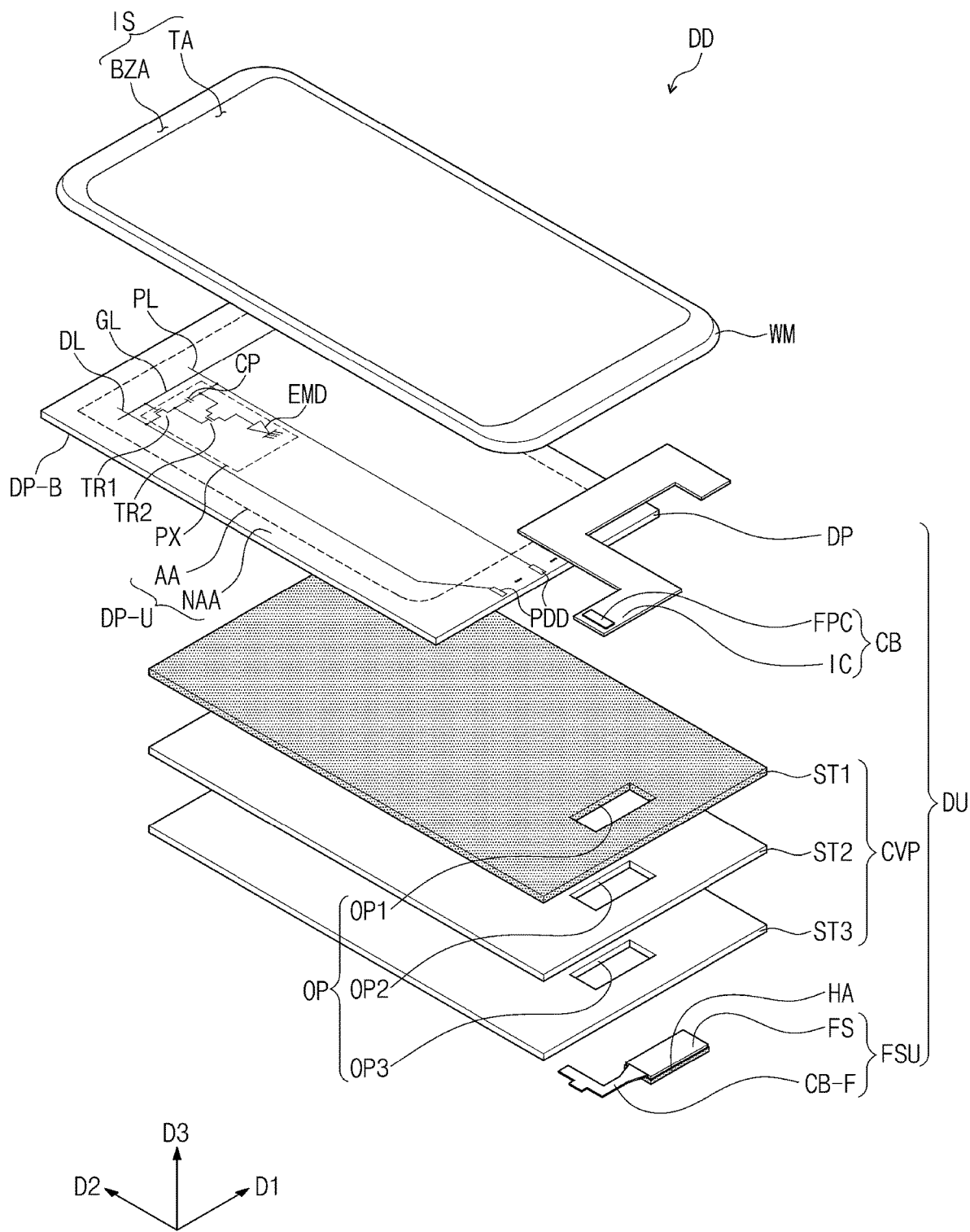
FIG. 3A is an exploded perspective view illustrating a portion of components illustrated in FIG. 1B.
Figure 3B:
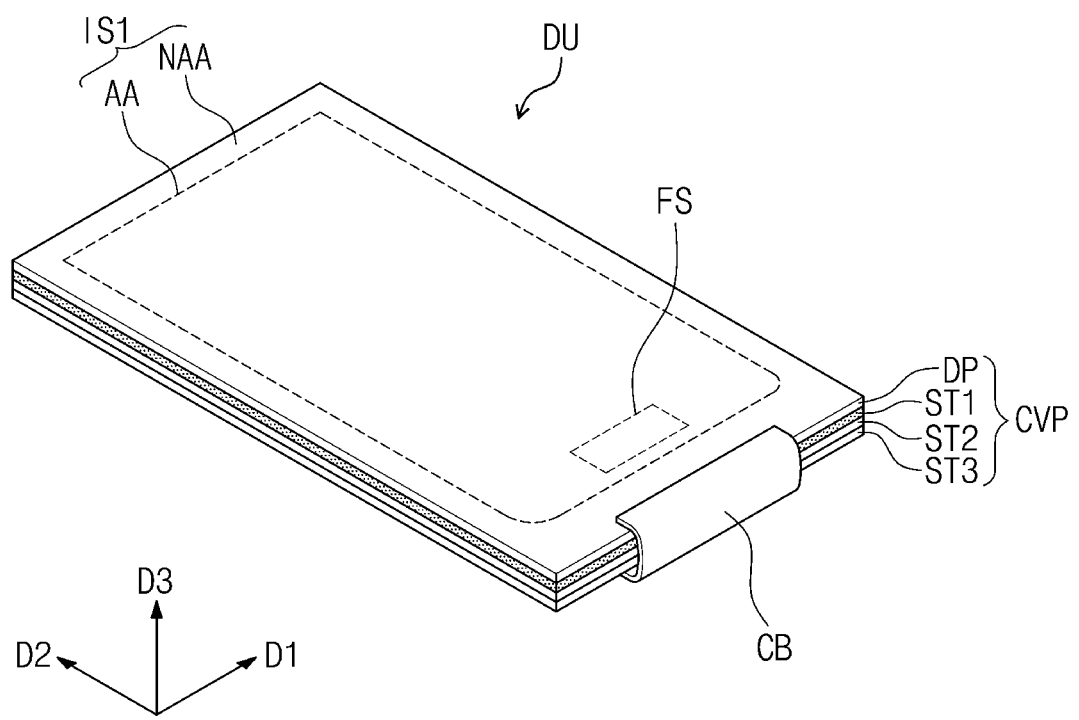
FIG. 3B is an assembled perspective view illustrating a portion of components illustrated in FIG. 3A.

FIG. 3A is an exploded perspective view illustrating a portion of components illustrated in FIG. 1B. FIG. 3B is an assembled perspective view illustrating a portion of components illustrated in FIG. 3A. FIG. 3A illustrates an exploded perspective view of the display device DD, and FIG. 3B illustrates an assembled perspective view of the display panel unit DU except for the window WM. Hereinafter, an embodiment of the inventive concept will be described with reference to FIGS. 3A and 3B.

The display device DD may include the window WM and the display panel unit DU. In more detail, the display panel unit DU includes the display panel DP, a circuit board CB, a lower panel CVP, the fingerprint sensing unit FSU, and an adhesive portion HA.

As described above, the window WM includes a front surface including the optically transparent transmitting area TA and the bezel area BZA adjacent to the transmitting area TA. Because the window WM corresponds to that illustrated in FIG. 1B, a duplicate description thereof will be omitted.

The display panel DP includes a front surface DP-U and a rear surface DP-B opposite to the front surface DP-U. The front surface DP-U may be divided into an active area AA and a peripheral area NAA. The display panel DP activates the active area AA in response to an electrical signal. The display panel DP displays the image IM in the activated active area AA. The transmitting area TA may overlap at least the entirety of the active area AA. The rear surface DP-B of the display panel DP, in accordance with an embodiment of the inventive concept, may be defined by a layer, closest to the lower panel CVP, of components of the display panel DP stacked in the third direction D3.

The peripheral area NAA is adjacent to the active area AA. The peripheral area NAA may encompass the edge of the active area AA. The peripheral area NAA is illustrative only. The peripheral area NAA may also be adjacent to only a portion of the edge of the active area AA, but is not limited to any one embodiment.

The peripheral area NAA may have various suitable types (kinds) of signal lines and/or electronic devices disposed therein to provide an electrical signal to the active area AA. The peripheral area NAA may be prevented or protected from being externally viewed by being covered by the bezel area BZA.

The display panel DP may include a plurality of signal lines GL, DL, and PL, a pixel PX, and a plurality of display pads PDD. The signal lines GL, DL, and PL may include a gate line GL, a data line DL, and a power line PL. The gate line GL, the data line DL, and the power line PL may transmit (provide) different electrical signals.

The gate line GL extends in the first direction D1. The gate line GL may be provided as a plurality of gate lines, and the gate lines may be spaced apart from each other in the second direction D2. FIG. 3A illustrates a single gate line GL as an example for ease of description.

In one or more embodiments, the display panel unit DU may further include a gate driving circuit mounted on the display panel DP to provide an electrical signal to the gate line GL. In this case, a gate driving circuit pad configured to provide an electrical signal to the gate driving circuit may constitute any one of the display pads PDD. Alternatively, the display panel DP may further include gate pads for electrical connection with the gate driving circuit provided to the outside. The gate pads may constitute any one of the display pads PDD.

The data line DL extends in the second direction D2. The data line DL may be electrically insulated from the gate line GL. The data line DL may be provided as a plurality of data lines, and the data lines may be spaced apart from each other in the first direction D1. FIG. 3A illustrates a single data line DL as an example for ease of description. The data line DL is connected to a data pad constituting any one of the display pads PDD. The data line DL provides, to the pixel PX, a data signal received through the data pad.

The power line PL extends in the second direction D2. The power line PL may be electrically insulated from the gate line GL and the data line DL. The power line PL may be provided as a plurality of power lines, and the power lines may be spaced apart from each other in the first direction D1. FIG. 3A illustrates a single power line PL as an example for ease of description. The power line PL may provide a power signal to the pixel PX.

The pixel PX is disposed in the active area AA. The pixel PX may be provided as a plurality of pixels, and the pixels may be connected to signal lines, respectively. The pixel PX displays light in response to an electrical signal to provide the image IM. FIG. 3A illustrates a single pixel PX as an example for ease of description.

The pixel PX may include a first thin-film transistor TR1, a second thin-film transistor TR2, a capacitor CP, and a light-emitting device EMD. The first thin-film transistor TR1, the second thin-film transistor TR2, the capacitor CP, and the light-emitting device EMD are electrically connected.

The first thin-film transistor TR1 may be a switching device configured to control turn-on or turn-off of the pixel PX. The first thin-film transistor TR1 is connected to the gate line GL and the data line DL. The first thin-film transistor TR1 is turned on by a gate signal provided through the gate line GL to provide, to the capacitor CP, a data signal provided through the data line DL.

The capacitor CP is charged by a voltage corresponding to the difference in potential between a first power signal provided from the power line PL and a signal provided from the first thin-film transistor TR1. The second thin-film transistor TR2 provides, to the light-emitting device EMD, the first power signal provided from the power line PL in response to the voltage charged in the capacitor CP.

The light-emitting device EMD may generate light or control the amount of light in response to an electrical signal. For example, the light-emitting device EMD may include an organic light-emitting device, a quantum dot light-emitting device, an electrophoretic device, and/or an electrowetting device.

The light-emitting device EMD is connected to a power terminal to receive a second power signal different from the power signal provided from the power line PL. A driving current, corresponding to the difference between an electrical signal provided from the second thin-film transistor TR2 and the second power signal, flows in the light-emitting device EMD, and the light-emitting device EMD may generate light corresponding to the drive current.

The pixel PX is illustrative only. The pixel PX may also include electronic devices having various suitable components and arrangements, but is not limited to any one embodiment.

The display pads PDD are disposed in the peripheral area NAA. The display pads PDD may be connected to the signal lines, respectively. The pixels PX may be electrically connected to devices disposed outside the display panel DP through the display pads PDD.

The circuit board CB is connected to the display pads PDD. The circuit board CB provides an electrical signal to the display panel DP through the display pads PDD. The circuit board CB may generate a signal configured to control the image IM or a power signal and provide the signal or the power signal to the display panel DP. The circuit board CB may include the FCB and a driving device IC.

The FCB may be electrically connected to the display panel DP through the display pads PDD. The FCB may be electrically or physically coupled to the display panel DP through an adhesive member (for example, an anisotropic conductive film). The FCB may include signal lines.

The driving device IC may be mounted on the FCB. The driving device IC may be connected to the signal lines of the FCB to be electrically connected to the display panel DP. The driving device IC generates or processes various suitable types (kinds) of electrical signals.

The lower panel CVP may be disposed on the rear surface DP-B of the display panel DP. The lower panel CVP may include a first sheet ST1, a second sheet ST2, and a third sheet ST3. The first sheet ST1 covers the rear surface DP-B of the display panel DP. The first sheet ST1 may be attached to the display panel DP through an adhesive member.

The first sheet ST1 may have light-shielding properties. The first sheet ST1 may include an optically opaque light-shielding material. For example, the first sheet ST1 may include black light-shielding tape. In accordance with an embodiment of the inventive concept, the display panel DP may include a transparent base substrate and the pixels arranged on the base substrate. Thus, external light incident on the front surface DP-U of the display panel DP or light generated by the pixels during driving of the display panel DP may be provided toward the rear surface DP-B of the display panel DP. When the rear surface DP-B of the display panel DP is defined by a rear surface of the transparent base substrate, components disposed on the rear surface DP-B of the display panel DP may be viewed on the front surface DP-U of the display panel DP by the external light or the like.

The first sheet ST1 may block the rear surface DP-B of the display panel DP from being reflected to prevent or protect the components disposed on the rear surface DP-B of the display panel DP from being viewed. The first sheet ST1 is illustrative only. The first sheet ST1 may also be a light-shielding layer formed on the rear surface DP-B of the display panel DP. In this case, the first sheet ST1 may be formed by coating the rear surface DP-B of the display panel DP with a material such as carbon or chromium, and an additional adhesive member may be omitted.

The second sheet ST2 may have heat dissipating properties. For example, the second sheet ST2 may be a sheet including a metallic material having high thermal conductivity, such as copper or aluminum. The second sheet ST2 is joined to a rear surface of the first sheet ST1. The second sheet ST2 may be joined to the first sheet ST1 through an adhesive member or may also be formed directly on the rear surface of the first sheet ST1.

The third sheet ST3 may have a cushioning function. The third sheet ST3 may be a synthetic resin foam. The third sheet ST3 includes a matrix member and a plurality of voids. The matrix member may include a flexible material. For example, the matrix member may include a synthetic resin. The voids may easily absorb impacts applied to the display panel DP. The voids may be defined as the third sheet ST3 has a porous structure. Thus, the voids may be dispersed in the matrix member. The voids may facilitate the shape transformation of the third sheet ST3. Thus, the voids improve the elasticity of the third sheet ST3 to increase the impact resistance of the lower panel CVP. The third sheet ST3 is joined to a rear surface of the second sheet ST2. The third sheet ST3 may be joined to the second sheet ST2 through an adhesive member or may also be formed directly on the rear surface of the second sheet ST2.

In the present embodiment, a set or predetermined opening portion OP may be defined in the lower panel CVP. The opening portion OP may pass through the first to third sheets ST1, ST2, and ST3 to expose the rear surface DP-B of the display panel DP. In more detail, a first opening portion OP1 passing through the first sheet ST1 to be formed as side walls of the first sheet ST1 may be defined in the first sheet ST1, a second opening portion OP2 passing through the second sheet ST2 to be formed as side walls of the second sheet ST2 may be defined in the second sheet ST2, and a third opening portion OP3 passing through the third sheet ST3 to be formed as side walls of the third sheet ST3 may be defined in the third sheet ST3. When viewed from the front, the first to third opening portions OP1, OP2, and OP3 may be aligned to constitute the opening portion OP of the lower panel CVP.

The fingerprint sensing unit FSU may be disposed on the rear surface DP-B of the display panel DP. The fingerprint sensing unit FSU may include a fingerprint sensor FS and a sensing circuit board CB-F. The sensing circuit board CB-F is electrically connected to the fingerprint sensor FS.

The fingerprint sensor FS may include sensors driven in various suitable manners. For example, the fingerprint sensor FS may include an optical fingerprint sensor sensing incident light by using an optical sensor and/or include an ultrasonic fingerprint sensor sensing vibrations by using a piezoelectric body, and a method of driving the fingerprint sensor FS is not limited to any one driving method.

The fingerprint sensor FS, in accordance with an embodiment of the inventive concept, may be in the opening portion OP defined in the lower panel CVP. In more detail, the fingerprint sensor FS may be in the first to third opening portions OP1 to OP3 to be disposed on the rear surface DP-B of the display panel DP. FIG. 3B illustrates an area in which the fingerprint sensor FS is disposed by dotted lines for ease of description. In the present embodiment, the fingerprint sensor FS may be disposed overlapping the active area AA.

The adhesive portion HA may bond the fingerprint sensor FS to the rear surface DP-B of the display panel DP. The adhesive portion HA may encompass the fingerprint sensor FS received in the opening portion OP. The adhesive portion HA will be detailed later.

Figure 4A:
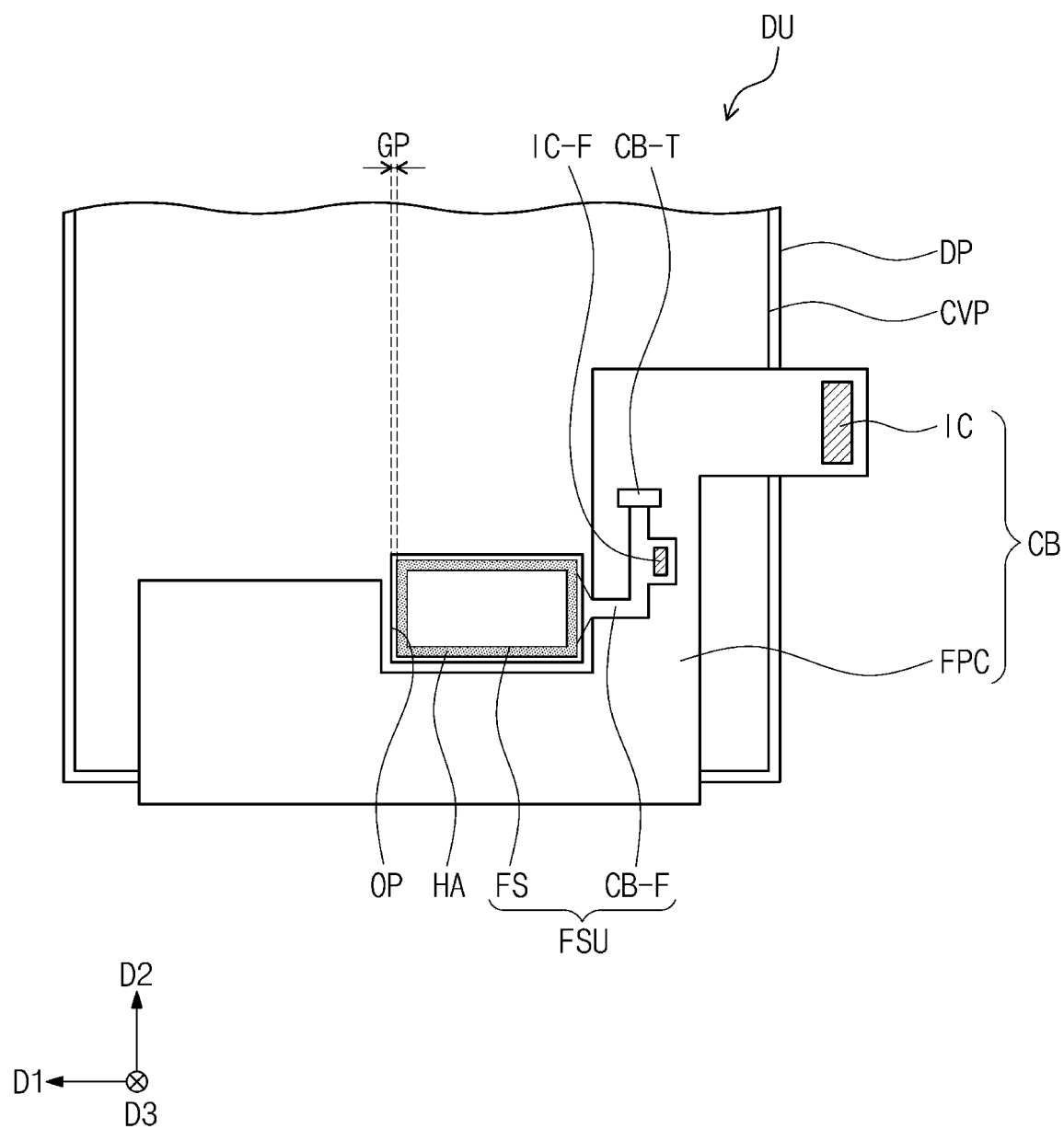
FIG. 4A is a rear view illustrating a portion of a display panel unit in accordance with an embodiment of the inventive concept.
Figure 4B:
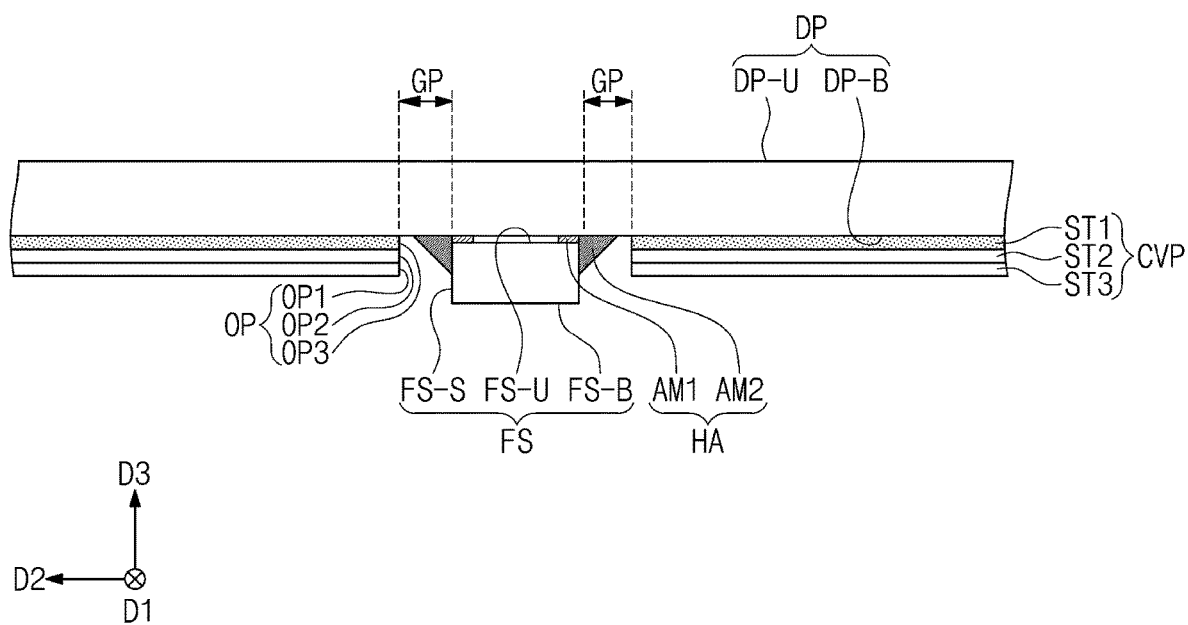
FIG. 4B is a cross-sectional view illustrating a portion of components of the display panel unit illustrated in FIG. 4A.
Figure 4C:
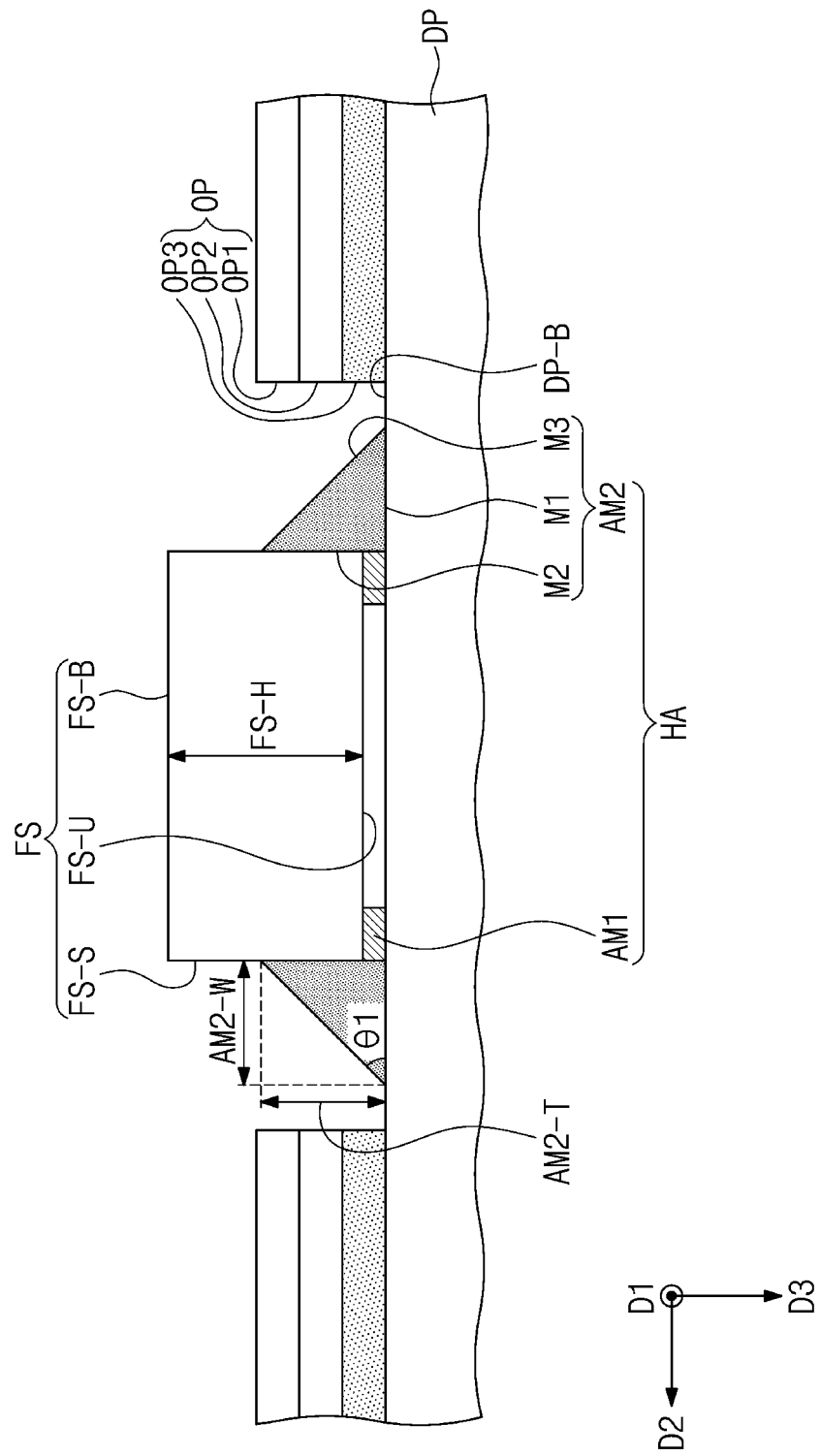
FIG. 4C is a cross-sectional view illustrating a portion of components of the display panel unit illustrated in FIG. 4A.
Figure 4D:
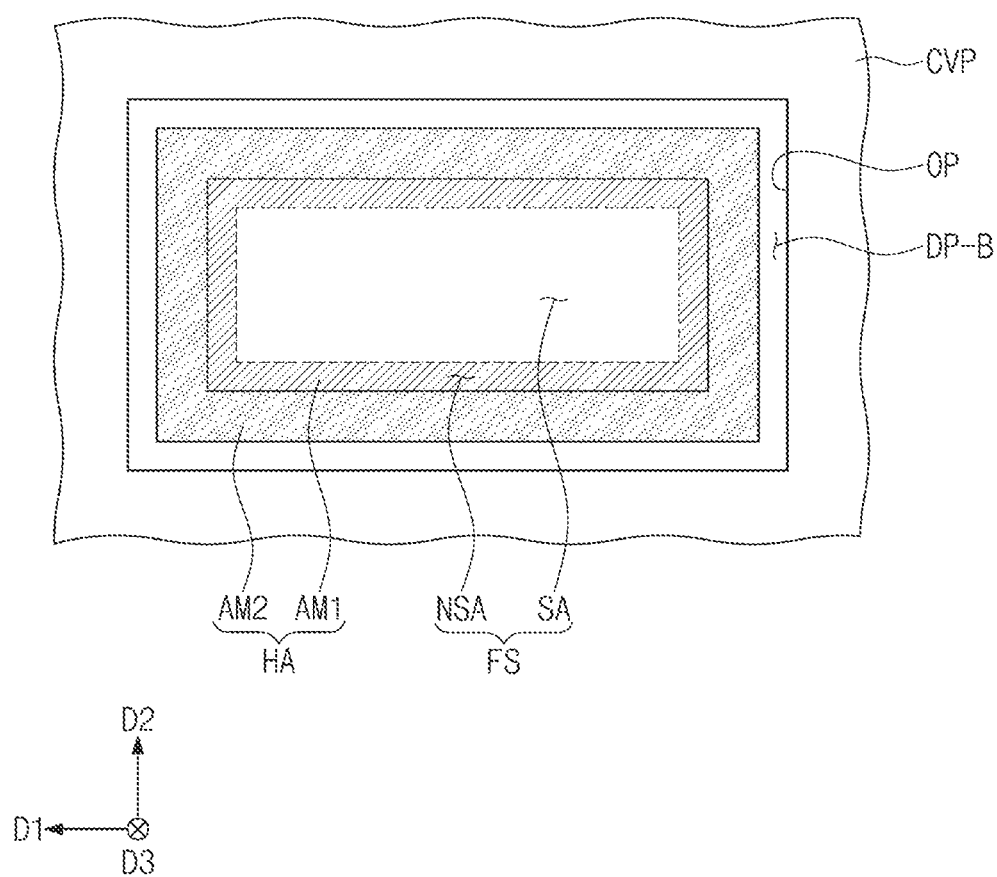
FIG. 4D is a plan view illustrating a portion of the display panel unit illustrated in FIG. 4A.

FIG. 4A is a rear view illustrating a portion of a display panel unit according to an embodiment of the inventive concept. FIG. 4B is a cross-sectional view illustrating a portion of components of the display panel unit illustrated in FIG. 4A. FIG. 4C is a cross-sectional view illustrating a portion of components of the display panel unit illustrated in FIG. 4A. FIG. 4D is a plan view illustrating a portion of the display panel unit illustrated in FIG. 4A. The same components as those described in FIGS. 1A to 3B are denoted by the same reference signs, and a duplicate description thereof will be omitted.

Referring to FIG. 4A, the circuit board CB may be bent (see FIG. 3B) and positioned on the lower panel CVP.

The sensing circuit board CB-F may be electrically connected to the circuit board CB. In the present embodiment, the sensing circuit board CB-F may be connected to the circuit board CB via a set or predetermined connector CB-T disposed on the circuit board CB. Thus, the fingerprint sensor FS is electrically connected to the circuit board CB and may transmit an electrical signal to, or receive an electrical signal from, the display panel DP. The sensing circuit board CB-F is illustrated as having a set or predetermined driving device IC-F mounted thereon. However, the sensing circuit board CB-F is illustrative only. The driving device IC-F may be removed from the sensing circuit board CB-F, and the sensing circuit board CB-F is not limited to any one embodiment.

The sensing circuit board CB-F may be partially received in the opening portion OP. For example, a portion of the sensing circuit board CB-F connected to the fingerprint sensor FS may overlap the first to third opening portions OP1 to OP3. The remainder of the sensing circuit board CB-F may extend outward from the opening portion OP to be connected to the circuit board CB.

The sensing circuit board CB-F is illustrative only. The entirety of the sensing circuit board CB-F may also be received in the opening portion OP defined in the lower panel CVP according to the shape and size of the sensing circuit board CB-F. However, the sensing circuit board CB-F is not limited to any one embodiment.

In accordance with an embodiment, the fingerprint sensor FS is received in the opening portion OP with a set or predetermined space GP from side walls of the opening OP. The adhesive portion HA may be disposed in the space GP to encompass the fingerprint sensor FS.

Referring to FIGS. 4B to 4D, FIGS. 4B and 4C illustrate cross-sectional views of the display panel DP, the lower panel CVP, the fingerprint sensor FS, and the adhesive portion HA, taken in the second direction D2, and FIG. 4D illustrates a plan view of the display panel DP as viewed from the rear surface DP-B.

The fingerprint sensor FS may include an upper portion FS-U divided into a sensing area SA and a non-sensing area NSA, a lower portion FS-B opposite to the upper portion FS-U, and lateral portions FS-S configured to connect the upper portion FS-U to the lower portion FS-B. Substantially, the upper portion FS-U, the lower portion FS-B, and the lateral portions FS-S may be components constituting an external case configured to protect the fingerprint sensor FS.

The sensing area SA is an area in which sensing devices are disposed and the user's fingerprint FNG (see FIG. 1A) may be substantially sensed. The non-sensing area NSA may be an area in which lines connected to the sensing devices are disposed.

The adhesive portion HA, in accordance with an embodiment, may include a first adhesive portion AM1 and a second adhesive portion AM2. The first adhesive portion AM1 may be disposed between the rear surface DP-B of the display panel DP and the upper portion FS-U of the fingerprint sensor FS. The first adhesive portion AM1 may serve primarily to bond the fingerprint sensor FS to the display panel DP. Thus, the first adhesive portion AM1 may be in contact with the rear surface DP-B of the display panel DP and the upper portion FS-U of the fingerprint sensor FS.

The first adhesive portion AM1, in accordance with an embodiment, may overlap the non-sensing area NSA of the upper portion FS-U of the fingerprint sensor FS. Thus, the first adhesive portion AM1 may have a closed line shape when viewed in a plan view. The first adhesive portion AM1 may allow a set or predetermined space to be provided between the rear surface DP-B of the display panel DP and the upper portion FS-U of the fingerprint sensor FS.

The first adhesive portion AM1 may include or be a tape. The first adhesive portion AM1 may also include or be an optically opaque light-shielding material. For example, the first adhesive portion AM1 may include or be a black light-shielding tape. Thus, a reflection preventing (blocking) function of the first sheet ST1 may be supplemented by disposing the first adhesive portion AM1 in a portion of the first opening portion OP1 from which the first sheet ST1 serving to shield light is partially removed.

The second adhesive portion AM2 may be disposed in the space GP between the side walls of the opening portion OP and the lateral portions FS-S of the fingerprint sensor FS. The second adhesive portion AM2 may be spaced apart from the side walls of the opening OP.

The second adhesive portion AM2 may encompass (e.g., be around or surround) at least a portion of the lateral portions FS-S of the fingerprint sensor FS. The second adhesive portion AM2 may serve secondarily to bond the fingerprint sensor FS to the display panel DP. Thus, the second adhesive portion AM2 may be in contact with the at least a portion of the lateral portions FS-S of the fingerprint sensor FS. The upper portion FS-U of the fingerprint sensor FS may be exposed from the second adhesive portion AM2.

The second adhesive portion AM2 may encompass the first adhesive portion AM1. Thus, the fingerprint sensor FS may be more firmly joined to the rear surface DP-B of the display panel DP.

The second adhesive portion AM2 may be provided as a resin. The second adhesive portion AM2 may include or be an optically opaque light-shielding material. For example, the second adhesive portion AM2 may include or be a black resin. Thus, the second adhesive portion AM2 may absorb light escaping to an area adjacent to the fingerprint sensor FS. Further, the reflection preventing function of the first sheet ST1 may be supplemented by disposing the second adhesive portion AM2 encompassing the first adhesive portion AM1 in the portion of the first opening portion OP1 from which the first sheet ST1 serving to shield light is partially removed.

The second adhesive portion AM2, in accordance with an embodiment, may include a first surface M1 being in contact with the rear surface DP-B of the display panel DP, a second surface M2 being in contact with the lateral portions FS-S of the fingerprint sensor FS, and a third surface M3 configured to connect the first surface M1 to the second surface M2. In accordance with an embodiment, at least a portion of the second surface M2 may be in contact with the first adhesive portion AM1.

In accordance with an embodiment of the inventive concept, the width of the second adhesive portion AM2 in the second direction D2 and the thickness thereof in the third direction D3 may vary according to the thickness of the fingerprint sensor FS in the third direction D3.

For example, each of the width AM2-W and thickness AM2-T of the second adhesive portion AM2 may be at least ½ to not more than ⅘ of the thickness FS-H of the fingerprint sensor FS. Thus, the minimum width of the second adhesive portion AM2 should be at least ½ of the thickness FS-H of the fingerprint sensor FS, and the maximum width of the second adhesive portion AM2 should be not more than ⅘ of the thickness FS-H of the fingerprint sensor FS.

When the width AM2-W or thickness AM2-T of the second adhesive portion AM2 is less than ½ of the thickness FS-H of the fingerprint sensor FS, the joining force between the fingerprint sensor FS and the display panel DP may be reduced. Thus, the fingerprint sensor FS may be detached from the rear surface DP-B of the display panel DP. As a result, because a data value sensed from the user's fingerprint FNG (see FIG. 1A) has a different value whenever the fingerprint is inputted, an error may occur.

When the width AM2-W or thickness AM2-T of the second adhesive portion AM2 is more than ⅘ of the thickness FS-H of the fingerprint sensor FS, the second adhesive portion AM2 may intrude on the lower portion FS-B of the fingerprint sensor FS. The lower portion FS-B of the fingerprint sensor FS is an area in which the sensing circuit board CB-F is connected to the fingerprint sensor FS, and the lower portion FS-B may cause a contact failure due to the second adhesive portion AM2.

The third surface M3, in accordance with an embodiment, may be a straight line when viewed in a cross-sectional view. The third surface M3 may be inclined at a set or predetermined angle from the rear surface DP-B of the display panel DP. The angle between the third surface M3 and the rear surface DP-B of the display panel DP may correspond to an angle of a tangent line at a point between the first surface M1 being in contact with the rear surface DP-B of the display panel DP and the third surface M3.

In accordance with an embodiment, a first angle $\theta 1$ of the tangent line at the point between the first surface M1 and the third surface M3 may be an acute angle. For example, the angle of the tangent line at the point between the first surface M1 and the third surface M3 may be at least 40° to not more than 45°. The first angle $\theta 1$ may vary according to the width AM2-W and thickness AM2-T of the second adhesive portion AM2 having a value of at least ½ to not more than ⅘ of the thickness FS-H of the fingerprint sensor FS.

In accordance with an embodiment of the inventive concept, the joining force between the fingerprint sensor FS and the display panel DP may be increased by including the first and second adhesive portions AM1 and AM2 having different materials and/or different shapes to fix the fingerprint sensor FS disposed on the rear surface DP-B of the display panel DP and changing the width AM2-W and thickness AM2-T of the second adhesive portion AM2, which covers at least a portion of the lateral portions FS-S of the fingerprint sensor FS, according to the thickness FS-H of the fingerprint sensor FS. Thus, the electronic apparatus ED having an improved sensing function may be provided.

Figure 5:
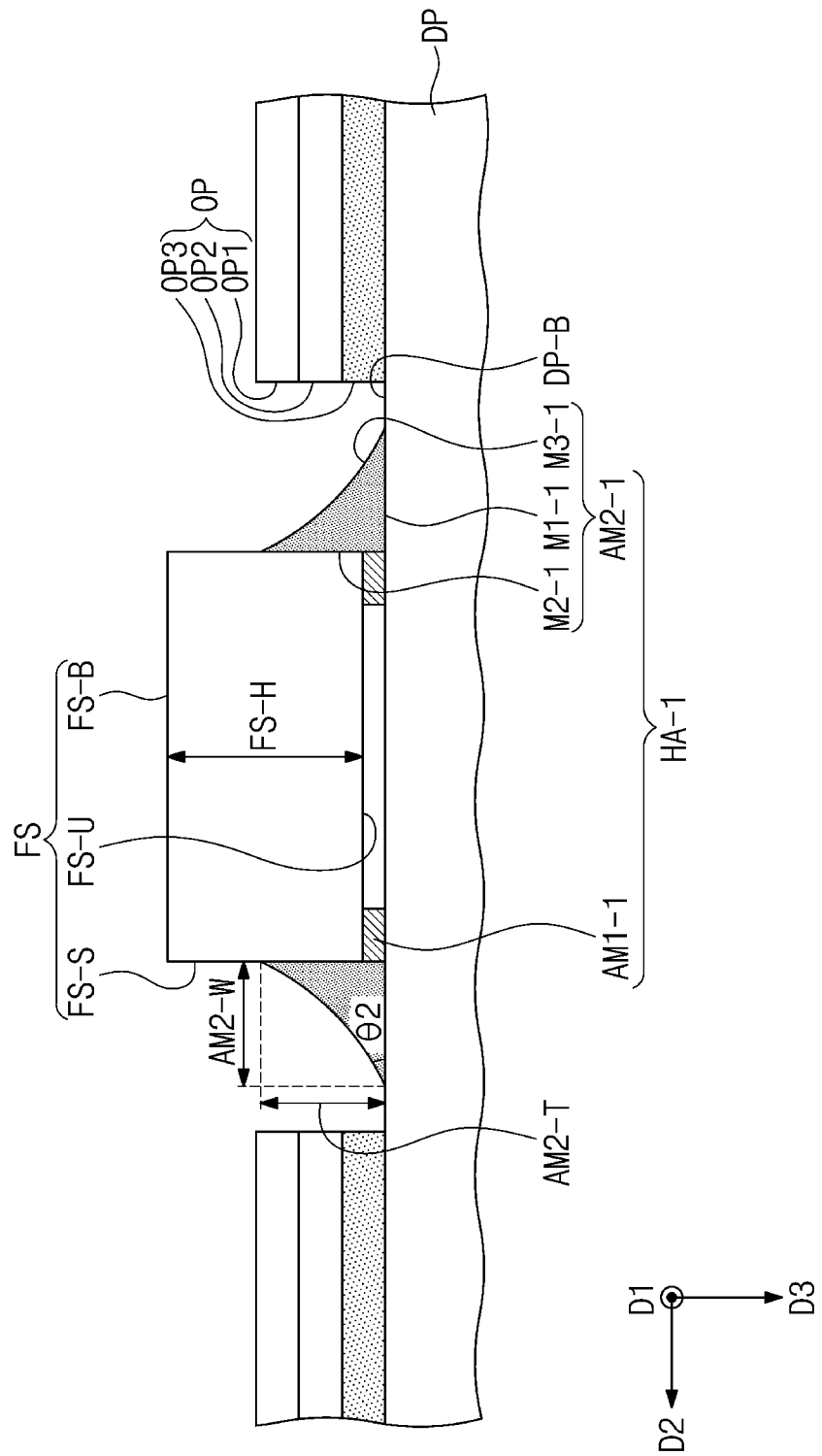
FIG. 5 is a cross-sectional view illustrating a portion of components of a display panel unit in accordance with an embodiment of the inventive concept.

FIG. 5 is a cross-sectional view illustrating a portion of components of a display panel unit according to an embodiment of the inventive concept. Components, which are the same as or similar to those described in FIGS. 1A to 4D, are denoted by the same or similar reference signs, and a duplicate description thereof will not be provided again.

Referring to FIG. 5, an adhesive portion HA-1 in accordance with an embodiment includes a first adhesive portion AM1-1 and a second adhesive portion AM2-1. The second adhesive portion AM2-1 may include a first surface M1-1 being in contact with a rear surface DP-B of a display panel DP, a second surface M2-1 being in contact with lateral portions FS-S of a fingerprint sensor FS, and a third surface M3-1 configured to connect the first surface M1-1 to the second surface M2-1. In accordance with an embodiment, at least a portion of the second surface M2-1 may be in contact with the first adhesive portion AM1-1.

Each of the width AM2-W and thickness AM2-T of the second adhesive portion AM2-1 may be at least ½ to not more than ⅘ of the thickness FS-H of the fingerprint sensor FS. Thus, the minimum width of the second adhesive portion AM2-1 is at least ½ of the thickness FS-H of the fingerprint sensor FS, and the maximum width of the second adhesive portion AM2-1 is not more than ⅘ of the thickness FS-H of the fingerprint sensor FS.

The third surface M3-1, in accordance with an embodiment, may be a curved surface. Thus, the third surface M3-1 may include a curved line when viewed in a cross-sectional view. The curved surface of the third surface M3-1 may have a shape concave in the direction toward each of the first surface M1-1 and the second surface M2-1.

The third surface M3-1 may be inclined at a set or predetermined angle from the rear surface DP-B of the display panel DP. In accordance with an embodiment, a second angle $\theta 2$ of a tangent line at a point between the first surface M1-1 and the third surface M3-1 may be an acute angle. For example, the minimum angle of the tangent line at the point between the first surface M1-1 and the third surface M3-1 may be at least 40°.

The second angle $\theta 2$ may vary according to the width AM2-W and thickness AM2-T of the second adhesive portion AM2-1 having a value of at least ½ to not more than ⅘ of the thickness FS-H of the fingerprint sensor FS within a range in which the third surface M3-1 has the concave shape.

Figure 6:
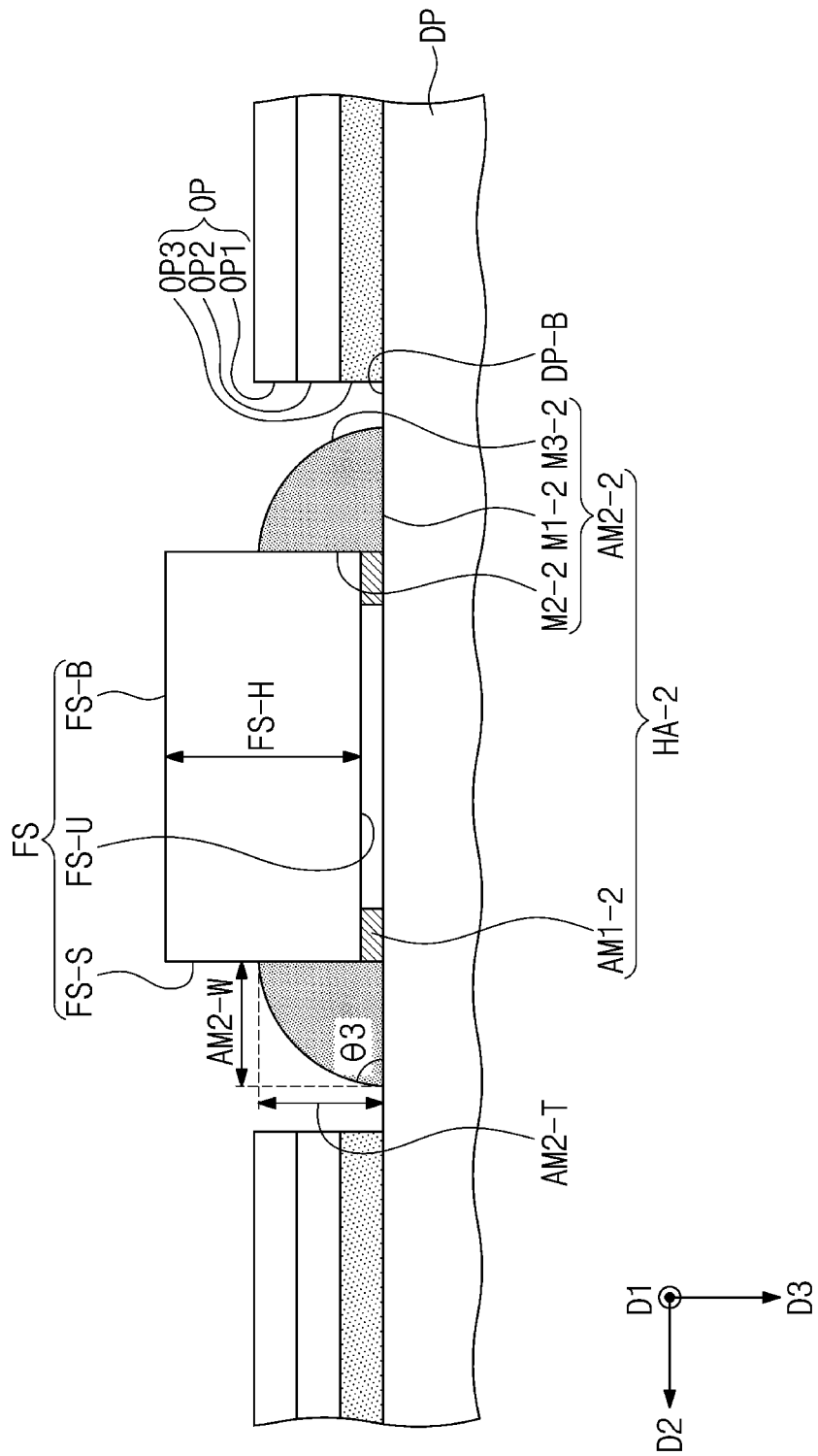
FIG. 6 is a cross-sectional view illustrating a portion of components of a display panel unit in accordance with an embodiment of the inventive concept.

FIG. 6 is a cross-sectional view illustrating a portion of components of a display panel unit according to an embodiment of the inventive concept. Components, which are the same as or similar to those described in FIGS. 1A to 4D, are denoted by the same or similar reference signs, and a duplicate description thereof will not be provided again.

Referring to FIG. 6, an adhesive portion HA-2 in accordance with an embodiment includes a first adhesive portion AM1-2 and a second adhesive portion AM2-2. The second adhesive portion AM2-2 may include a first surface M1-2 being in contact with a rear surface DP-B of a display panel DP, a second surface M2-2 being in contact with lateral portions FS-S of a fingerprint sensor FS, and a third surface M3-2 configured to connect the first surface M1-2 to the second surface M2-2. In accordance with an embodiment, at least a portion of the second surface M2-2 may be in contact with the first adhesive portion AM1-2.

Each of the width AM2-W and thickness AM2-T of the second adhesive portion AM2-2 may be at least ½ to not more than ⅘ of the thickness FS-H of the fingerprint sensor FS. Thus, the minimum width of the second adhesive portion AM2-2 should be at least ½ of the thickness FS-H of the fingerprint sensor FS, and the maximum width of the second adhesive portion AM2-2 should be not more than ⅘ of the thickness FS-H of the fingerprint sensor FS.

The third surface M3-2, in accordance with an embodiment, may be a curved surface. Thus, the third surface M3-2 may include a curved line when viewed in a cross-sectional view. The curved surface of the third surface M3-2 may have a convex shape in the direction away from each of the first surface M1-2 and the second surface M2-2.

The third surface M3-2 may be inclined at a set or predetermined angle from the rear surface DP-B of the display panel DP. In accordance with an embodiment, a third angle θ3 of a tangent line at a point between the first surface M1-2 and the third surface M3-2 may be an acute angle. For example, the maximum angle of the tangent line at the point between the first surface M1-2 and the third surface M3-2 may be not more than 60°.

The third angle θ3 may vary according to the width AM2-W and thickness AM2-T of the second adhesive portion AM2-2 having a value of at least ½ to not more than ⅘ of the thickness FS-H of the fingerprint sensor FS within a range in which the third surface M3-2 has the convex shape.

Figure 7:
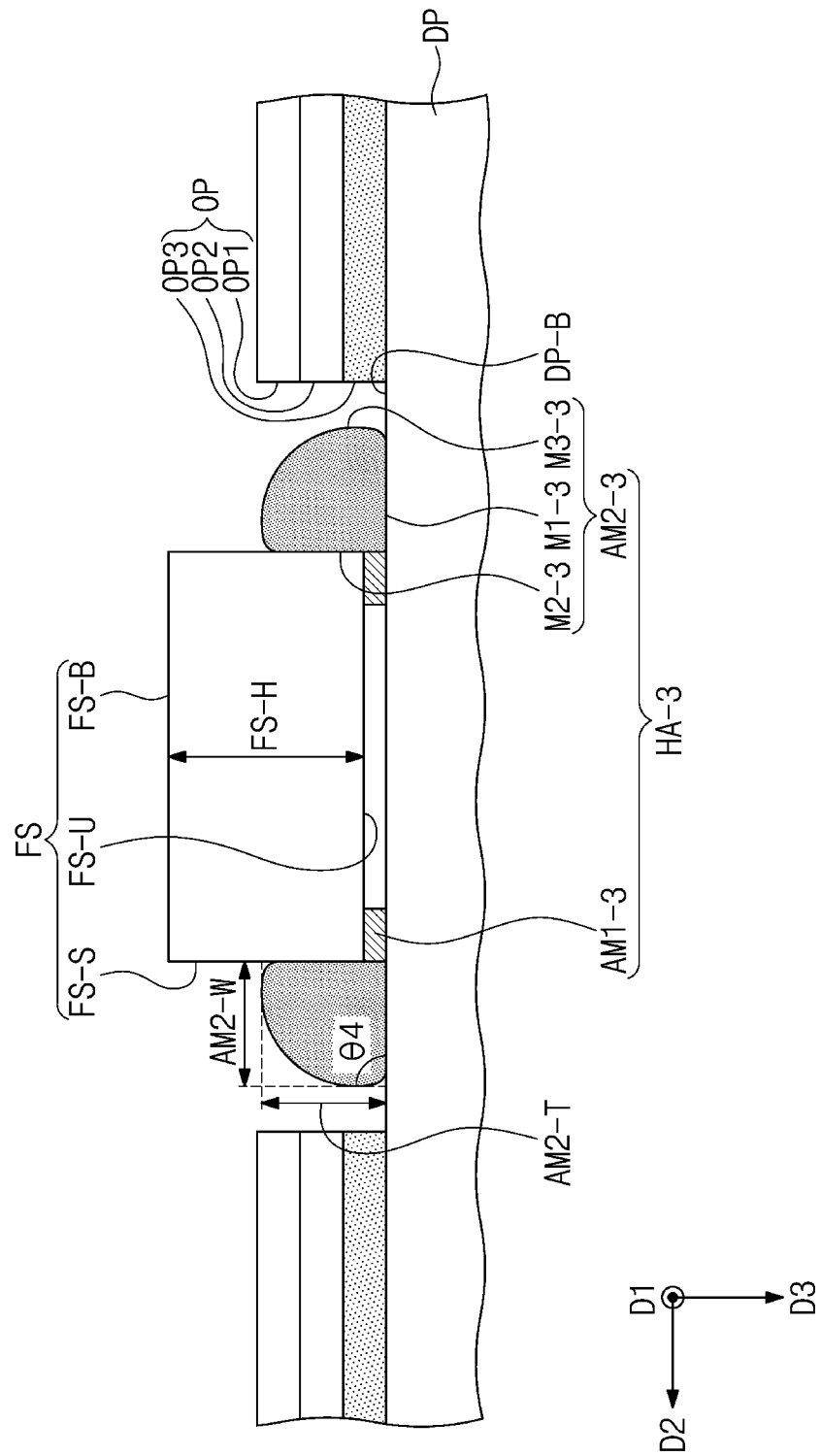
FIG. 7 is a cross-sectional view illustrating a portion of components of a display panel unit in accordance with an embodiment of the inventive concept.

FIG. 7 is a cross-sectional view illustrating a portion of components of a display panel unit according to an embodiment of the inventive concept. Components, which are the same as or similar to those described in FIGS. 1A to 4D, are denoted by the same or similar reference signs, and a duplicate description thereof will not be provided again.

Referring to FIG. 7, an adhesive portion HA-3 in accordance with an embodiment includes a first adhesive portion AM1-3 and a second adhesive portion AM2-3. The second adhesive portion AM2-3 may include a first surface M1-3 being in contact with a rear surface DP-B of a display panel DP, a second surface M2-3 being in contact with lateral portions FS-S of a fingerprint sensor FS, and a third surface M3-3 configured to connect the first surface M1-3 to the second surface M2-3. In accordance with an embodiment, at least a portion of the second surface M2-3 may be in contact with the first adhesive portion AM1-3.

Each of the width AM2-W and thickness AM2-T of the second adhesive portion AM2-3 may be at least ½ to not more than ⅘ of the thickness FS-H of the fingerprint sensor FS. Thus, the minimum width of the second adhesive portion AM2-3 should be at least ½ of the thickness FS-H of the fingerprint sensor FS, and the maximum width of the second adhesive portion AM2-3 should be not more than ⅘ of the thickness FS-H of the fingerprint sensor FS.

The third surface M3-3, in accordance with an embodiment, may be a curved surface. Thus, the third surface M3-3 may include a curved line when viewed in a cross-sectional view. The curved surface of the third surface M3-3 may have a shape convex in the direction away from each of the first surface M1-3 and the second surface M2-3.

The third surface M3-3 may be inclined at a set or predetermined angle from the rear surface DP-B of the display panel DP. In accordance with an embodiment, a fourth angle θ4 of a tangent line at a point between the first surface M1-3 and the third surface M3-3 may be an obtuse angle.

Unlike the second adhesive portion AM2-2 of FIG. 6, the maximum width of the second adhesive portion AM2-3 in accordance with an embodiment may not be the width of the first surface M1-3, and the maximum thickness of the second adhesive portion AM2-3 may not be the thickness of the second surface M2-3. As the fourth angle θ4 is obtuse, the minimum width AM2-W of the second adhesive portion AM2-3 may be the width of the first surface M1-3, and the minimum thickness AM2-T may be the thickness of the second surface M2-3.

Figure 8:
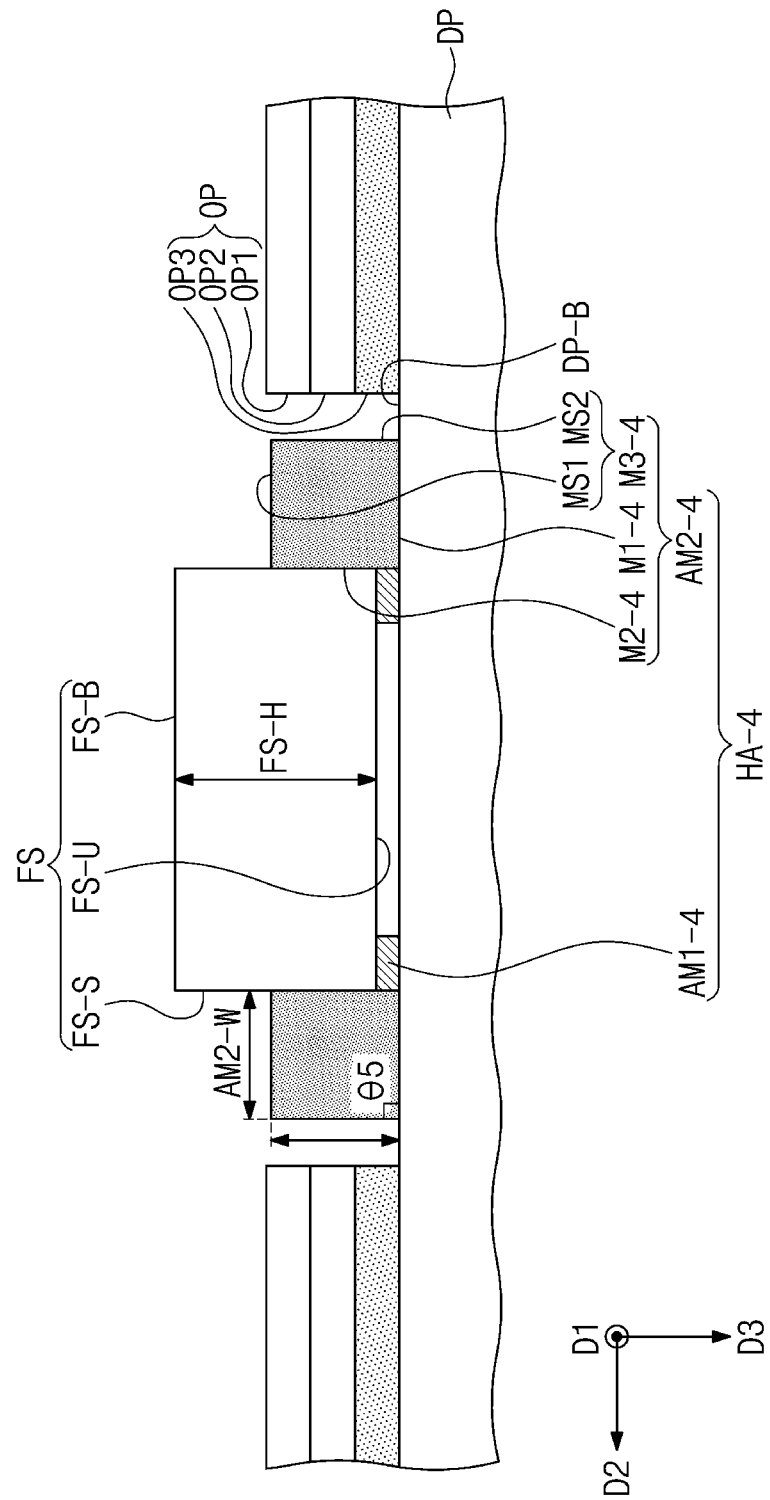
FIG. 8 is a cross-sectional view illustrating a portion of components of a display panel unit in accordance with an embodiment of the inventive concept.

FIG. 8 is a cross-sectional view illustrating a portion of components of a display panel unit according to an embodiment of the inventive concept. Components, which are the same as or similar to those described in FIGS. 1A to 4D, are denoted by the same or similar reference signs, and a duplicate description thereof will not be provided again.

Referring to FIG. 8, an adhesive portion HA-4 in accordance with an embodiment includes a first adhesive portion AM1-4 and a second adhesive portion AM2-4. The second adhesive portion AM2-4 may include a first surface M1-4 being in contact with a rear surface DP-B of a display panel DP, a second surface M2-4 being in contact with lateral portions FS-S of a fingerprint sensor FS, and a third surface M3-4 configured to connect the first surface M1-4 to the second surface M2-4. In accordance with an embodiment, at least a portion of the second surface M2-4 may be in contact with the first adhesive portion AM1-4.

Each of the width AM2-W and thickness AM2-T of the second adhesive portion AM2-4 may be at least ½ to not more than ⅘ of the thickness FS-H of the fingerprint sensor FS. Thus, the minimum width of the second adhesive portion AM2-4 should be at least ½ of the thickness FS-H of the fingerprint sensor FS, and the maximum width of the second adhesive portion AM2-4 should be not more than ⅘ of the thickness FS-H of the fingerprint sensor FS.

The third surface M3-4, in accordance with an embodiment, includes a first subsurface MS1 and a second subsurface MS2. The first subsurface MS1 may be inclined at a set or predetermined angle from the rear surface DP-B of the display panel DP. In accordance with an embodiment, a fifth angle θ5 of a tangent line at a point between the first surface M1-4 and the second subsurface MS2 may be a right angle. Further, an angle of a tangent line at a point between the first subsurface MS1 and the second subsurface MS2 may be the same as the fifth angle θ5. Thus, the second adhesive portion AM2-4 may have a quadrangular shape when viewed in a cross-sectional view.

Figure 9:
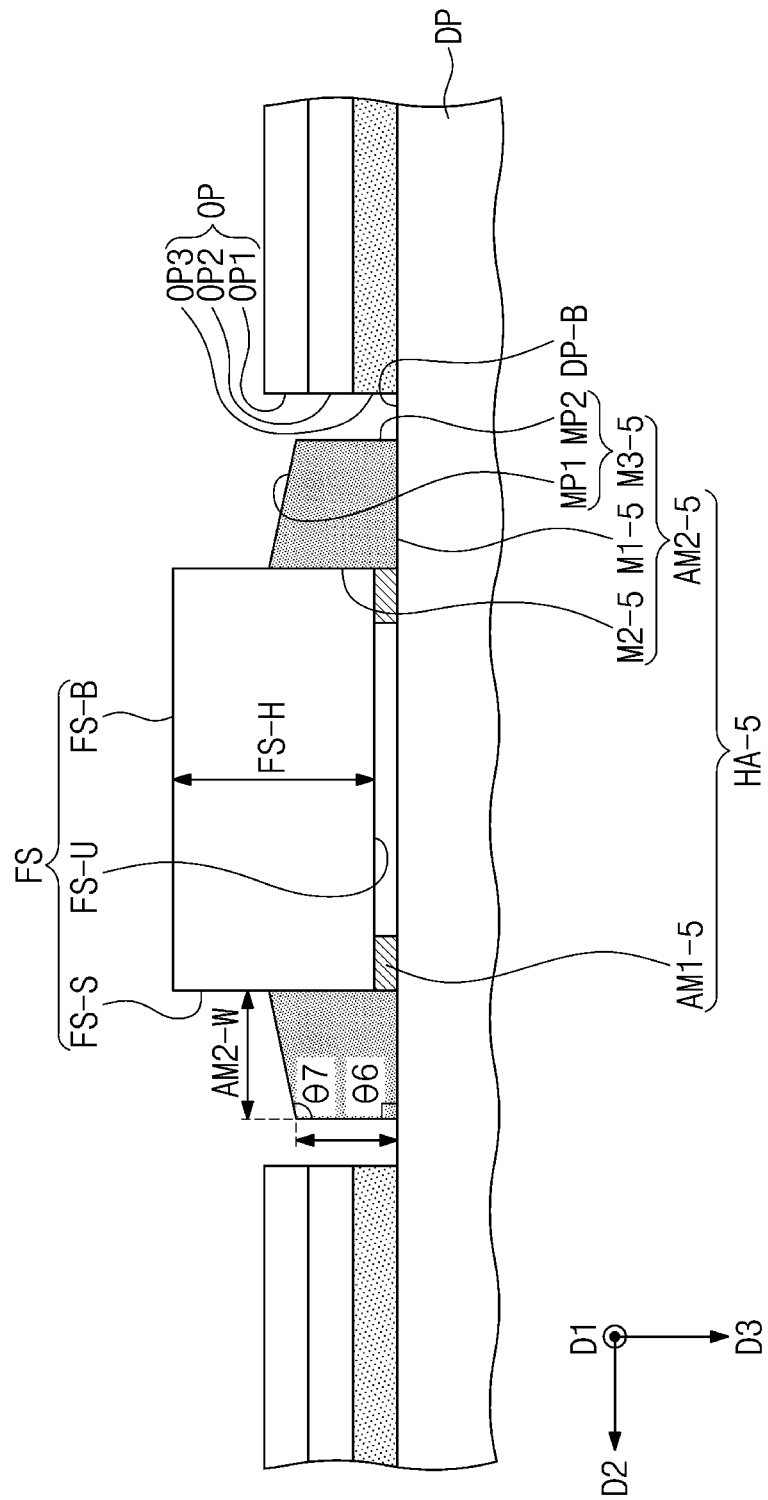
FIG. 9 is a cross-sectional view illustrating a portion of components of a display panel unit in accordance with an embodiment of the inventive concept.

FIG. 9 is a cross-sectional view illustrating a portion of components of a display panel unit according to an embodiment of the inventive concept. Components, which are the same as or similar to those described in FIGS. 1A to 4D, are denoted by the same or similar reference signs, and a duplicate description thereof will not be provided again.

Referring to FIG. 9, an adhesive portion HA-5 in accordance with an embodiment includes a first adhesive portion AM1-5 and a second adhesive portion AM2-5. The second adhesive portion AM2-5 may include a first surface M1-5 being in contact with a rear surface DP-B of a display panel DP, a second surface M2-5 being in contact with lateral portions FS-S of a fingerprint sensor FS, and a third surface M3-5 configured to connect the first surface M1-5 to the second surface M2-5. In accordance with an embodiment, at least a portion of the second surface M2-5 may be in contact with the first adhesive portion AM1-5.

Each of the width AM2-W and thickness AM2-T of the second adhesive portion AM2-5 may be at least ½ to not more than ⅘ of the thickness FS-H of the fingerprint sensor FS. Thus, the minimum width of the second adhesive portion AM2-5 should be at least ½ of the thickness FS-H of the fingerprint sensor FS, and the maximum width of the second adhesive portion AM2-5 should be not more than ⅘ of the thickness FS-H of the fingerprint sensor FS.

The third surface M3-5, in accordance with an embodiment, includes a first subsurface MP1 and a second subsurface MP2. The first subsurface MP1 may be inclined at a set or predetermined angle from the rear surface DP-B of the display panel DP. In accordance with an embodiment, a sixth angle θ6 of a tangent line at a point between the first surface M1-5 and the second subsurface MP2 may be a right angle. Unlike in FIG. 8, the angle between the first subsurface MP1 and the second subsurface MP2 may be different from the sixth angle θ6. For example, a seventh angle θ7 of a tangent line at a point between the first subsurface MP1 and the second subsurface MP2 may be greater than the sixth angle θ6.

Figure 10:
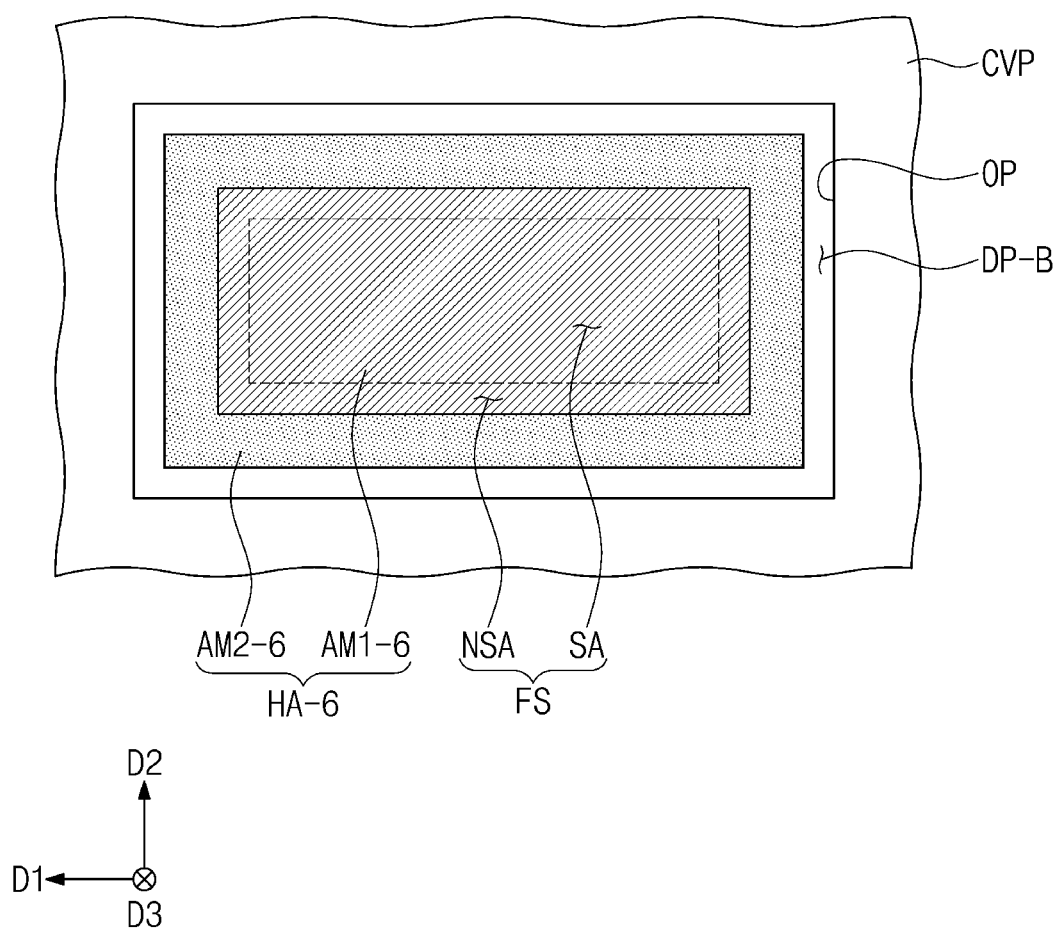
FIG. 10 is a plan view illustrating a portion of a display panel unit in accordance with an embodiment of the inventive concept.

FIG. 10 is a plan view illustrating a portion of a display panel unit according to an embodiment of the inventive concept. Components, which are the same as or similar to those described in FIGS. 1A to 4D, are denoted by the same or similar reference signs, and a duplicate description thereof will not be provided again.

Referring to FIG. 10, an adhesive portion HA-6 in accordance with an embodiment includes a first adhesive portion AM1-6 and a second adhesive portion AM2-6. Unlike the shape of the first adhesive portion AM1 of FIG. 4D, the first adhesive portion AM1-6 in accordance with an embodiment may cover the entire surface of an upper portion FS-U of a fingerprint sensor FS (see FIG. 4B). Thus, the first adhesive portion AM1-6 may overlap each of a sensing area SA and a non-sensing area NSA.

The first adhesive portion AM1 has the closed line shape as illustrated in FIG. 4B, and thus a set or predetermined space is provided between the sensing area SA of the upper portion FS-U of the fingerprint sensor FS and the rear surface DP-B of the display panel DP. However, because the first adhesive portion AM1-6 in FIG. 10 covers the entire surface of the upper portion FS-U of the fingerprint sensor FS, the set or predetermined space described in FIG. 4B may not be formed.

In accordance with an embodiment, the sensing performance of the fingerprint sensor FS may be increased when the fingerprint sensor is ultrasonic sensing which requires a medium between the fingerprint sensor FS and the display panel DP.

In accordance with embodiments of the inventive concept, the joining force between a fingerprint sensor and a display panel may be increased by including adhesive portions having different materials in order to fix the fingerprint sensor disposed on a rear surface of the display panel and changing the width and thickness of each of the adhesive portions, which cover at least a portion of a lateral portion of the fingerprint sensor, according to the thickness of the fingerprint sensor. Thus, a display device having an improved sensing function may be provided.

Although exemplary embodiments of the present invention have been described, it is understood that the present invention should not be limited to these exemplary embodiments, and that various suitable changes and modifications can be made by one of ordinary skill in the art within the spirit and scope of the present invention as hereinafter claimed.

Thus, the technical scope of the present invention is not limited to the contents described in the detailed description of the specification, but should be determined by the claims and equivalents thereof.

What is claimed is:

1. An electronic apparatus comprising:
    a display panel including a front surface divided into an active area and a peripheral area adjacent to the active area and a rear surface opposite to the front surface;
    a lower panel on the rear surface of the display panel and having an opening portion defined therein;
    a fingerprint sensor including an upper portion divided into a sensing area and a non-sensing area surrounding, and adjacent to, the sensing area in a plan view, a lower portion opposite to the upper portion, and a lateral portion to connect the upper portion to the lower portion, the fingerprint sensor being in the opening portion with a space from a side wall of the opening portion; and
    an adhesive portion to bond the fingerprint sensor to the display panel,
    wherein the adhesive portion includes: a first adhesive portion between the rear surface of the display panel and the upper portion of the fingerprint sensor, the first adhesive portion covering the non-sensing area in the plan view; and a second adhesive portion around at least a portion of the lateral portion of the fingerprint sensor, and
    a width and a thickness of the second adhesive portion are each at least ½, and not more than ⅘, of a thickness between the upper and lower portions of the fingerprint sensor,
    wherein the first adhesive portion has a closed line shape surrounding and being adjacent to the sensing area in the plan view, the first adhesive portion comprising an opening exposing the sensing area,
    wherein the second adhesive portion surrounds, and is adjacent to, the first adhesive portion,
    wherein the second adhesive portion includes: a first surface being in contact with the rear surface of the display panel; a second surface being in contact with the lateral portion of the fingerprint sensor and the first adhesive portion; and a third flat surface to connect the first surface to the second surface, the third flat surface being inclined from the rear surface of the display panel, and
    wherein an angle of a tangent line at a point between the first surface and the third flat surface is at least 40° and not more than 60°.

2. The electronic apparatus of claim 1, wherein the first adhesive portion is a tape.

3. The electronic apparatus of claim 1, wherein the second adhesive portion is a resin.

4. The electronic apparatus of claim 1, wherein the second adhesive portion fills the space and is in contact with the rear surface of the display panel.

5. The electronic apparatus of claim 1, wherein the upper portion of the fingerprint sensor is exposed from the second adhesive portion.

6. The electronic apparatus of claim 1, wherein the fingerprint sensor is an optical and/or ultrasonic sensor.

7. The electronic apparatus of claim 1, further comprising a circuit board connected to the peripheral area of the display panel and a sensing circuit board connected to the fingerprint sensor, the circuit board and the sensing circuit board being connected to each other.

8. The electronic apparatus of claim 1, wherein the lower panel includes at least one of a light-shielding sheet, a cushion sheet, or a heat dissipation sheet.

9. An electronic apparatus comprising:
- a display panel including a front surface divided into an active area and a peripheral area adjacent to the active area and a rear surface opposite to the front surface;
- a lower panel on the rear surface of the display panel and having an opening portion defined therein;
- a fingerprint sensor on the rear surface of the display panel and in the opening portion with a space from a side wall of the opening portion, the fingerprint sensor including an upper portion divided into a sensing area and a non-sensing area surrounding, and adjacent to, the sensing area in a plan view and facing the rear surface of the display panel, a lower portion opposite to the upper portion, and a lateral portion to connect the upper portion to the lower portion;
- a first adhesive portion being in contact with the rear surface of the display panel and the upper portion of the fingerprint sensor, the first adhesive portion covering the non-sensing area in the plan view; and
- a second adhesive portion being in contact with at least a portion of the lateral portion of the fingerprint sensor, a width and a thickness of the of the second adhesive portion each being at least ½, and not more than ⅘, of a thickness between the upper and lower portions of the fingerprint sensor,
- the first adhesive portion having a closed line shape surrounding and being adjacent to the sensing area in a plan view, and the second adhesive portion being configured to surround and be adjacent to the first adhesive portion,
- wherein the first adhesive portion comprises an opening exposing the sensing area,
- wherein the second adhesive portion includes: a first surface being in contact with the rear surface of the display panel; a second surface being in contact with the lateral portion of the fingerprint sensor and the first adhesive portion; and a third flat surface to connect the first surface to the second surface, the third flat surface being inclined from the rear surface of the display panel, and
- wherein an angle of a tangent line at a point between the first surface and the third flat surface is at least 40° and not more than 60°.

10. The electronic apparatus of claim 9, wherein the first adhesive portion is a tape, and the second adhesive portion is a resin.

* * * * *